(12) United States Patent
Trappe

(10) Patent No.: US 6,669,251 B2
(45) Date of Patent: Dec. 30, 2003

(54) BUMPER BEAM AND BUMPER ASSEMBLY INCLUDING A BUMPER BEAM

(75) Inventor: Adam K. Trappe, Chesterfield Township, MI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/181,191
(22) PCT Filed: Sep. 12, 2001
(86) PCT No.: PCT/US01/28453

§ 371 (c)(1),
(2), (4) Date: Jul. 11, 2002

(87) PCT Pub. No.: WO03/022638

PCT Pub. Date: Mar. 20, 2003

(65) Prior Publication Data

US 2003/0047952 A1 Mar. 13, 2003

(51) Int. Cl.⁷ ............................................... B60R 19/03
(52) U.S. Cl. ....................... 293/120; 293/109; 293/110; 293/133
(58) Field of Search ................................ 293/109, 110, 293/120, 122, 133, 140, 155

(56) References Cited

U.S. PATENT DOCUMENTS

| | | | |
|---|---|---|---|
| 3,884,455 A | * | 5/1975 | Weller et al. ............... 293/136 |
| 3,938,841 A | | 2/1976 | Glance et al. |
| 3,997,207 A | * | 12/1976 | Norlin ........................ 293/133 |
| 4,424,996 A | | 1/1984 | Yoshiyuki |
| 4,951,986 A | | 8/1990 | Hanafusa et al. |
| 5,056,840 A | * | 10/1991 | Eipper et al. ............... 293/120 |
| 5,269,574 A | * | 12/1993 | Bhutani et al. ............. 293/120 |
| 5,425,561 A | * | 6/1995 | Morgan ...................... 293/120 |
| 5,643,989 A | * | 7/1997 | Van De Grampel et al. ..... 524/494 |
| 5,988,713 A | * | 11/1999 | Okamura et al. ........... 293/120 |
| 6,082,792 A | | 7/2000 | Evans et al. |
| 6,179,355 B1 | * | 1/2001 | Chou et al. ................. 293/120 |
| 6,247,745 B1 | * | 6/2001 | Carroll et al. .............. 293/133 |
| 6,286,879 B1 | | 9/2001 | Haque et al. |
| 6,354,641 B1 | * | 3/2002 | Schroeder et al. .......... 293/122 |
| 6,406,081 B1 | * | 6/2002 | Mahfet et al. .............. 293/120 |
| 6,511,109 B1 | * | 1/2003 | Schultz et al. ............. 293/120 |

* cited by examiner

Primary Examiner—Dennis H. Pedder
Assistant Examiner—Lori L Coletta
(74) Attorney, Agent, or Firm—Armstrong Teasdale LLP

(57) ABSTRACT

A bumper assembly for an automotive vehicle includes a beam and an energy absorber. The energy absorber includes a flanged frame for attachment to the beam and a body extending from the frame. The body includes a first transverse wall, a second transverse wall spaced from the first wall and a plurality of tunable crush boxes extending therebetween. The bumper assembly has greater than fifty percent efficiency.

16 Claims, 6 Drawing Sheets

BUMPER BEAM AND BUMPER ASSEMBLY INCLUDING A BUMPER BEAM

CROSS REFERENCE TO RELATED APPLICATIONS

This application claims the benefit of International Application No. PCT/US01/28453 filed Sep. 12, 2001.

BACKGROUND OF THE INVENTION

This invention relates generally to bumpers and, more particularly, to energy absorbing vehicle bumper systems.

Bumpers typically extend widthwise across the front and rear of a vehicle and are mounted to rails that extend in a lengthwise direction. Energy absorbing bumper systems attempt to reduce vehicle damage as a result of a collision by managing impact energy and intrusion while not exceeding a rail load limit of the vehicle.

Steel beams are commonly used as bumpers. A steel beam is very stiff and provides structural strength and rigidity. Steel beams, however, are heavy. In addition, steel beams can crush or buckle and do not maintain a section modulus throughout an impact event.

Some bumper assemblies include shock aborbers. Such shock absorbers are positioned, for example, between a steel bumper beam and the vehicle rails. The shock absorbers are intended to absorb at least some of the energy resulting from an impact. Adding shock absorbers to a bumper assembly results in an added cost and complexity as compared to a steel beam. The shocks also add weight to the bumper assembly, which is also undesirable since such added weight may reduce the overall fuel efficiency of the vehicle.

Other known energy absorbing bumper systems include a beam and an energy absorber. The beam typically is steel. An energy absorber commonly used with steel beams is foam. Foam based energy absorbers typically have slow loading upon impact, which results in a high displacement. Further, foams are effective to a sixty or seventy percent compression, and beyond that point, foams become incompressible so that the impact energy is not fully absorbed. The remaining impact energy is absorbed through deformation of the beam and/or vehicle structure.

The efficiency of a bumper system, or assembly, is defined as the amount of energy absorbed over distance, or the amount of energy absorbed over load. A high efficiency bumper system absorbs more energy over a shorter distance than a low energy absorber. High efficiency is achieved by building load quickly to just under the rail load limit and maintaining that load constant until the impact energy has been dissipated. Known shockless bumper systems that include a steel beam with a foam energy absorber generally have an efficiency less than fifty percent (50%).

BRIEF SUMMARY OF THE INVENTION

In one aspect, a shockless bumper system for an automotive vehicle is provided. The bumper system comprises a thermoplastic beam and an energy absorber. The bumper has greater than fifty percent (50%) efficiency.

In another aspect, a beam for a bumper assembly is provided. The beam comprises a glass mat thermoplastic and is configured to have a thermoplastic energy absorber attached thereto.

In yet another aspect, a bumper assembly comprising a beam configured to maintain a section modulus throughout an impact event is provided. The assembly further comprises an energy absorber coupled to the beam, and a fascia attached to the energy absorber substantially envelops the beam and energy absorber.

DETAILED DESCRIPTION OF THE INVENTION

A bumper system that includes a compression molded glass mat thermoplastic (GMT) beam is described below in detail. In an example embodiment, an energy absorber of the non-foam type is attached to the beam. Combining a high stiffness thermoplastic beam with a non foam type energy absorber results in a bumper system that achieves fast loading and efficient energy absorption upon impact. Specifically, impact forces during low speed impact are maintained just below a predetermined level by deforming the energy absorber and beam until the kinetic energy of the impact event has been absorbed. When the low speed impact is over, the energy absorber returns substantially to its original shape and retains sufficient integrity to withstand subsequent impacts.

Combining the high stiffness properties of a GMT compression molded beam with the efficient energy absorbing properties of a thermoplastic energy absorber with is also believed to provide improved impact absorbing performance over traditional metal beams with foam energy absorbers. In addition, the thermoplastic energy absorber and GMT beam combination is believed to provide more efficient impact absorption than steel beams with a thermoplastic energy absorbers or GMT beams with foam energy absorbers.

Although the bumper system is described below with reference to specific materials (e.g., Azdel® material (commercially available from Azdel, Inc., Shelby, N.C. for the beam, as described in U.S. Pat. No. 5,643,989) and Xenoy® material (commercially available from General Electric Company, Pittsfield, Mass.) for the energy absorber), the system is not limited to practice with such materials and other materials can be used. In addition, the beam need not necessarily be a GMT compression molded beam, and other materials and fabrication techniques can be utilized. Generally, the energy absorber is selecting from materials that result in efficient energy absorption, and the beam materials and fabrication technique are selected to result in a stiff beam.

Figure 1:
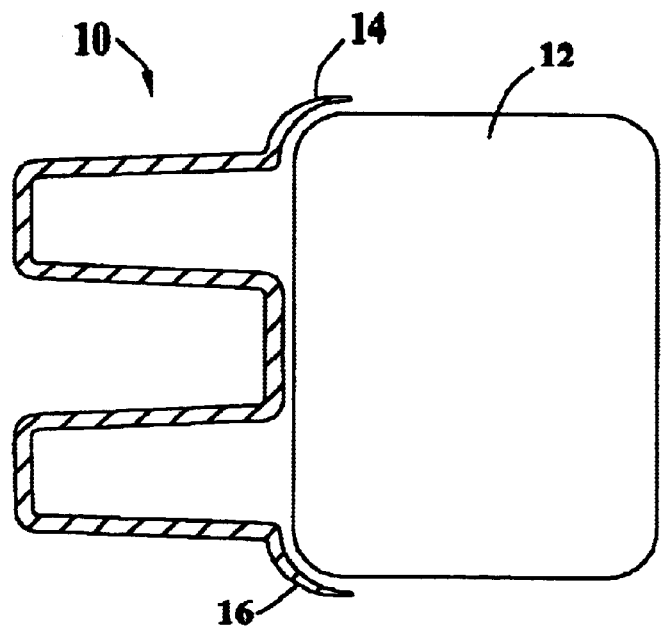
FIG. 1 is a cross-sectional view of a known energy absorber shown in a pre-impact condition.
Figure 2:
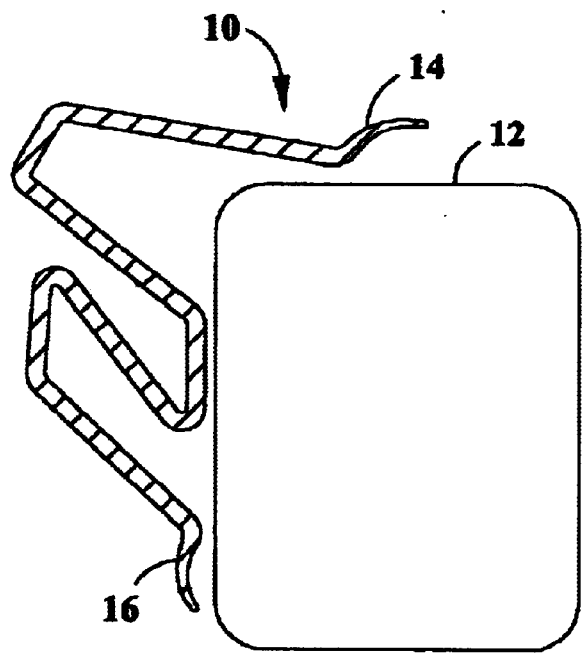
FIG. 2 is a cross-sectional view of a known energy absorber shown in a post-impact condition.

Referring now specifically to the drawings, FIGS. 1 and 2 are cross-sectional views a known energy absorber 10 as used in association with a reinforcing beam 12. Energy absorber 10 includes upper and lower flanges 14 and 16, respectively, which upon installation overlap a portion of beam 12. As shown in FIG. 2, absorber 10 tends to buckle as opposed to absorbing and dissipating the impact energy resulting from a collision.

Figure 3:
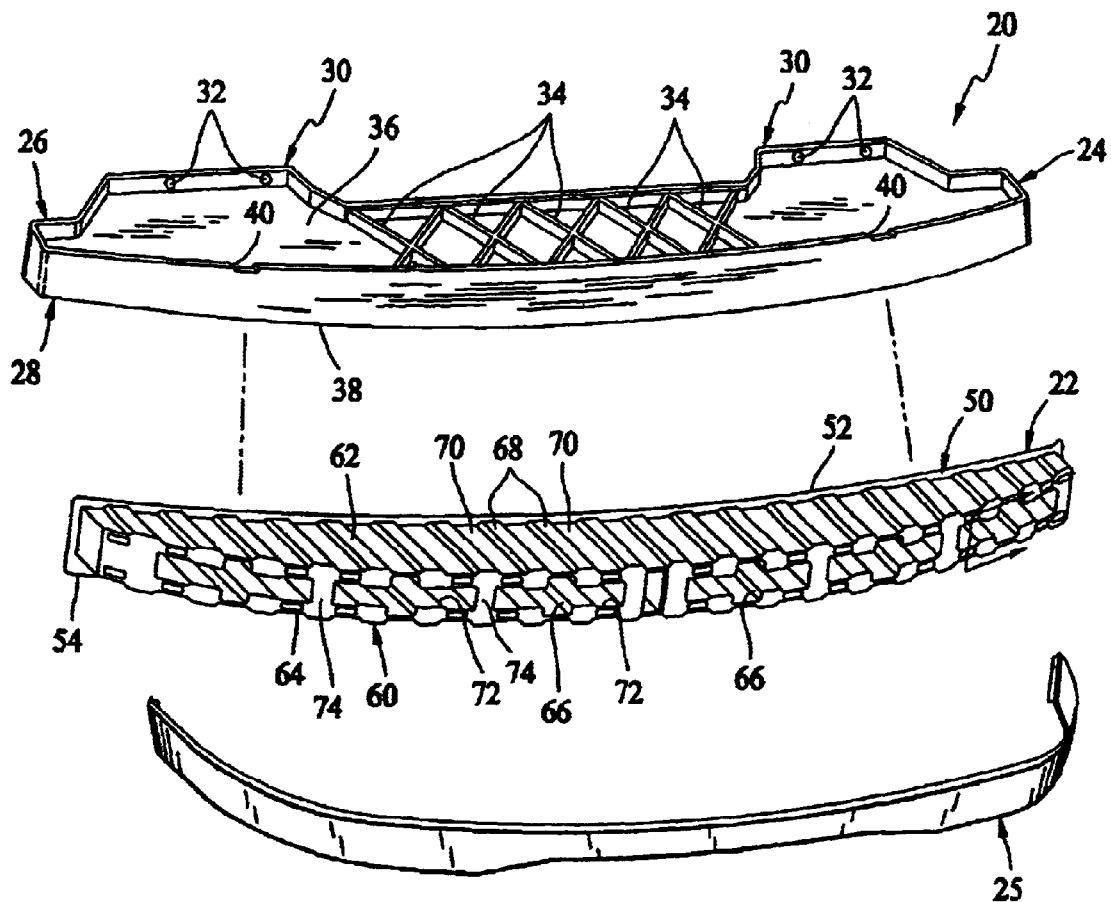
FIG. 3 is an exploded perspective view of one embodiment of a bumper assembly including a compression molded I-beam and injection molded energy absorber.

FIG. 3 is an exploded perspective view of one embodiment of a bumper system 20. System 20 includes an energy absorber 22 and a beam 24. Energy absorber 22 which is positioned between beam 24 and a fascia 25 which, when assembled, form a vehicle bumper. As should be understood by those skilled in the art, beam 24 is attached to lengthwise extending frame rails (not shown).

The fascia is generally formed from a thermoplastic material which preferably is amenable to finishing utilizing conventional vehicle painting and/or coating techniques. Generally, the fascia will envelop both energy absorber 22 and reinforcing beam 24 such that neither component is visible once attached to the vehicle.

Beam 24, in the example embodiment, is a compression molded glass mat thermoplastic (GMT) and is configured as an I-beam. Geometries other than an I-beam geometry can be used. For example, a C or W cross-sectional shape can be used to provide a desired section modulus depending on the particular application in which the beam is to be used.

Beam 24 includes a continuous upper flange 26 and lower flange 28. Beam 24 also includes rail attachment sections 30 having openings 32 so that bolts (not shown) can pass therethrough to secure bumper system 20 to the frame rails. Beam 24 further includes cross-ribs 34 for stiffening. Ribs 34 on an upper surface 36 of beam 24 are visible in FIG. 3. Identical ribs (not shown) also are on a lower surface 38 of beam 24. Locator cut-outs 40 in upper flange 26 facilitate locating energy absorber 22 on beam 24 as described below.

Energy absorber 22 includes a frame 50 having first and second longitudinally extending flanges 52 and 54, respectively, which overlap the beam 24. Flange 52 is u-shaped and flange 54 includes a finger 56 which forms a snap fit with flange 28 of beam 24, i.e., finger 56 snaps over an end of flange 28.

Absorber 22 further includes a body 60 that extends outward from frame 50, and body 60 includes a first transverse wall 62 and a second transverse wall 64 having a plurality of tunable crush boxes 66 extending therebetween. The transverse walls 62, 64 are rippled including alternating raised areas 68 and depressed areas 70 which provide the transverse walls with an added degree of stiffness to resist deflection upon impact. The width and depth dimensions of the ripples can be modified to achieve different stiffness characteristics as desired. Crush boxes include side walls 72, an outer wall 74, and open areas 76 that extend to the inner frame 50.

Figure 5:
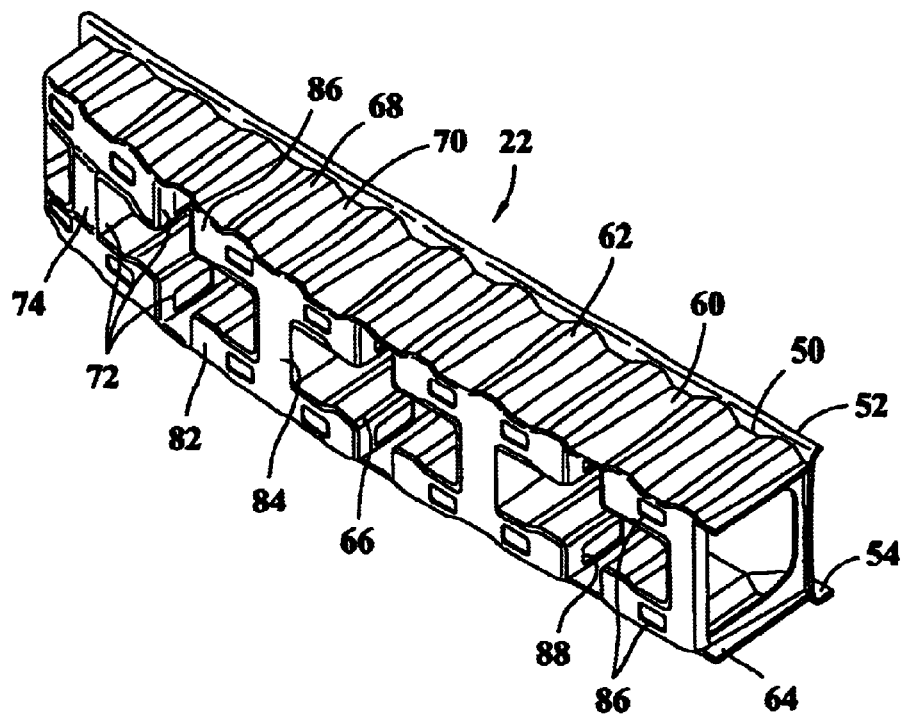
FIG. 5 is a rear perspective view of a portion of the energy absorber shown in FIGS. 3 and 4.

Referring to FIG. 5, crush boxes 66 can have any one of a number of different geometries depending on the impact energy requirements for the vehicle. Example crush boxes 66 have an overall three-dimensional I-shape including a wing or top portion 80 adjacent first transverse wall 62 and a bottom wing portion 82 adjacent second transverse wall 64 and parallel to first top portion 80 with a longitudinal cross member portion 84 adjoining top and bottom portions 80, 82. Crush boxes 66 of energy absorber 22 stabilize energy absorber 22 during an impact event. In this regard, crush boxes 66 provide for an axial crush mode in both barrier and pendulum impacts according to Federal Motor Vehicle Safety Standard (FMVSS) and Canadian Motor Vehicle Safety Standard (CMVSS). Crush boxes 66 also provide a stiffness tunability in order to meet the desired impact load deflection criteria. That is, certain modifications can be made to the crush boxes 66 for any given application in an effort to meet the targeted criteria. For example, crush boxes 66 include a plurality of windows 86 and 88 in side and outer walls 72 and 74. As described below, windows 86 and 88 can be configured to have one of many different shapes depending on the particular application.

The tunability of crush boxes 66 can also be tailored for specific applications by varying the side and rear wall thickness. For example, for the nominal wall thickness of side 72 and outer walls 74 may broadly range from about 1.75 mm to about 3.0 mm. More specifically, for certain low impact applications the nominal wall thickness may generally range from about 1.75 mm to about 2.0 mm and for other applications, particularly those for a 5 mph FMVSS or CMVSS system, the nominal wall thickness for the side and rear walls would more likely be in the range of about 2.5 mm to 3.0 mm.

Another aspect in appropriately tuning energy absorber 22 is the selection of the thermoplastic resin to be employed. The resin employed may be a low modulus, medium modulus or high modulus material as needed. By carefully considering each of these variables, energy absorbers meeting the desired energy impact objectives can be manufactured.

Figure 6:
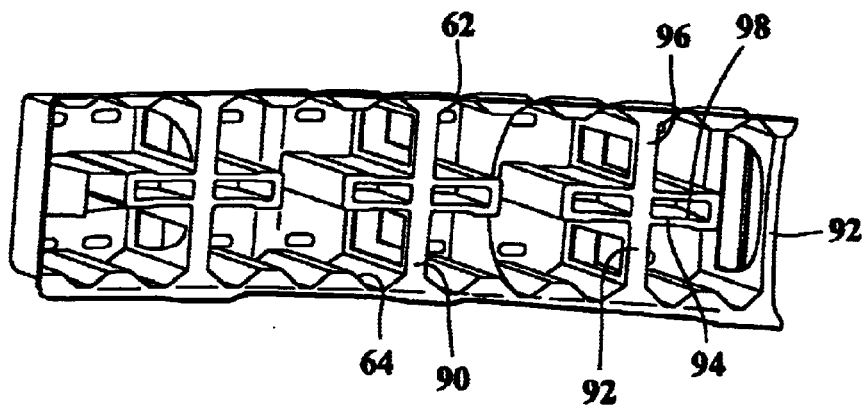
FIG. 6 is a front perspective view of a portion of the energy absorber shown in FIGS. 3 and 4.

As illustrated in FIG. 6, integrally molded connecting members 90 extend vertically between the first and second transverse walls 62 and 64, respectively. Connecting members 90 may be in the form of vertically extending posts 92 or may have a cross shaped structure including both a vertically extended posts 92 and horizontally extending posts 94. Regardless of the configuration of connecting members 90, connecting member 90 may have a minimum average width to height ratio of 1:5 along inner wall 96 of vertically extending post 92, the height being measured as the distance between the first and second traverse walls 62 and 64, respectively. If connecting member 90 includes windows 98 the width to height ratio is 1:3. Inner wall 96 are adjacent the outer face of beam 24 when energy absorber 22 is attached thereto.

Figure 7:
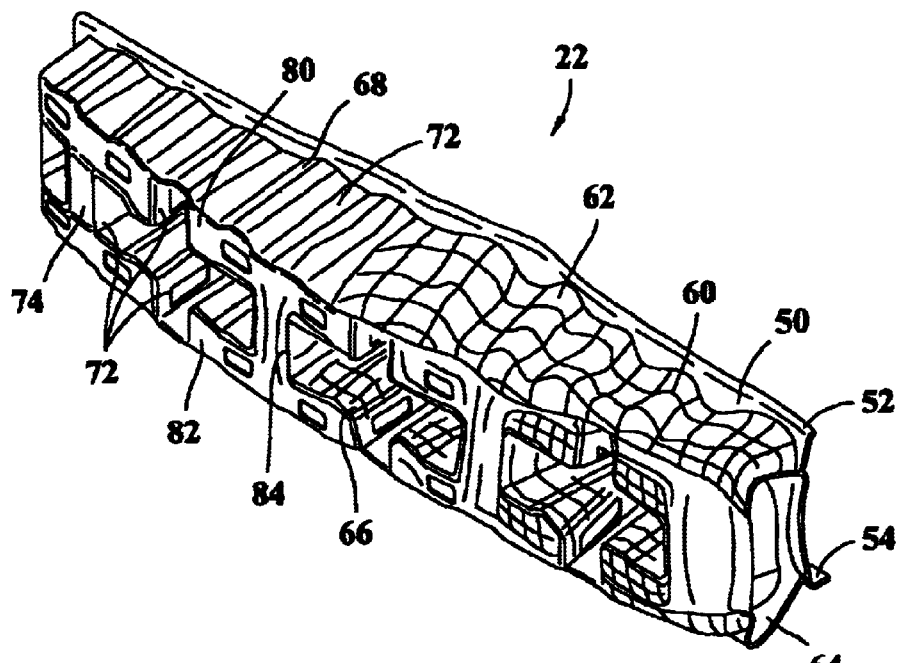
FIG. 7 is a front perspective of a portion of the energy absorber shown in FIGS. 3 and 4.
Figure 8:
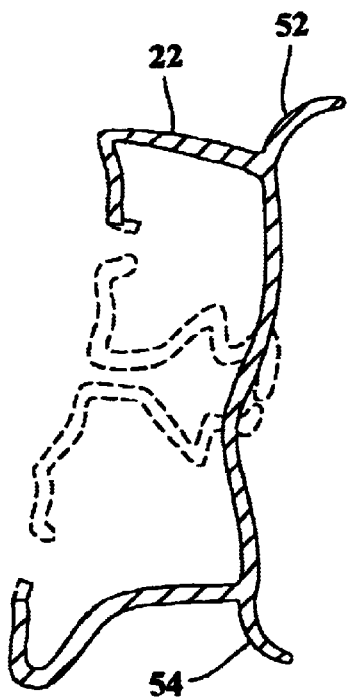
FIG. 8 is a cross-sectional view of the energy absorber shown in FIGS. 3 and 4 in post-impact condition.

Referring to FIGS. 7 and 8, energy absorber 22 is shown in a theoretical post impact condition. As can be seen, energy absorber 22 crumples but should remain in contact with beam 24, particularly along first and second longitudinal flanges 52 and 54, respectively.

Figure 9:
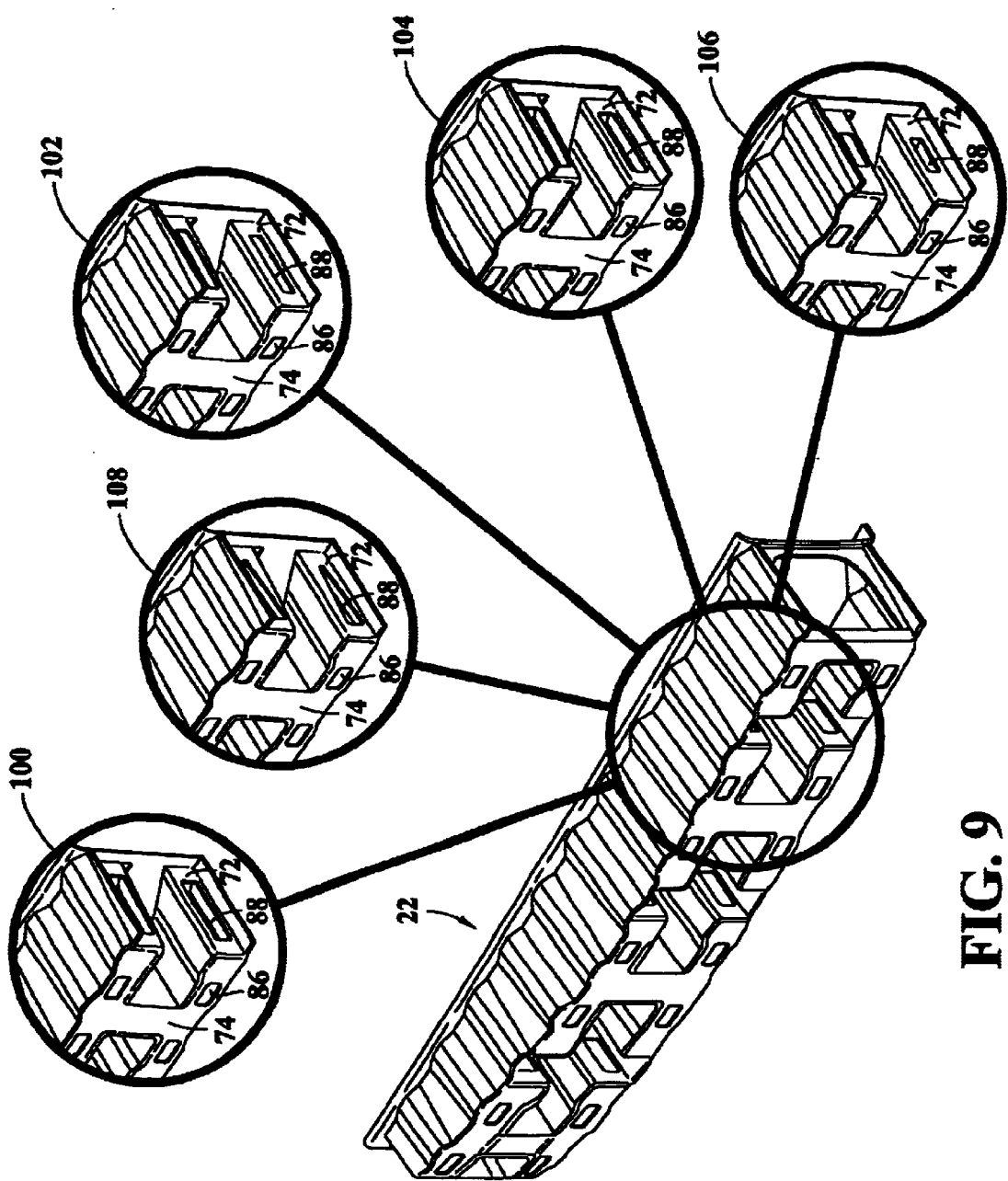
FIG. 9 is a perspective view of an energy absorber with illustrating magnified partial perspective views of alternative window arrangements.

Referring to FIG. 9 and the tunability of crush boxes 66, windows 86, 88 can be, but are not limited to, squares and rectangles of different dimensions as shown at 100, 102, 104, 106 and tear drop shapes as shown at 108 in order to achieve the desired stiffness of the crush box. To form the windows, a typical mold will include approximately a 5° open draft angle so as to obtain suitable manufacturing conditions.

Figure 4:
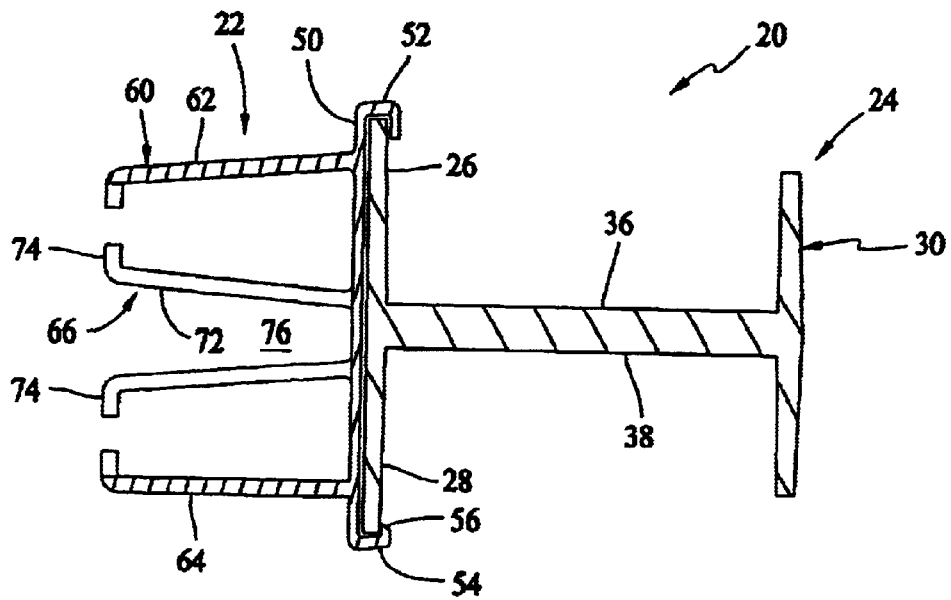
FIG. 4 is a cross-sectional view of the bumper assembly shown in FIG. 3.
Figure 10:
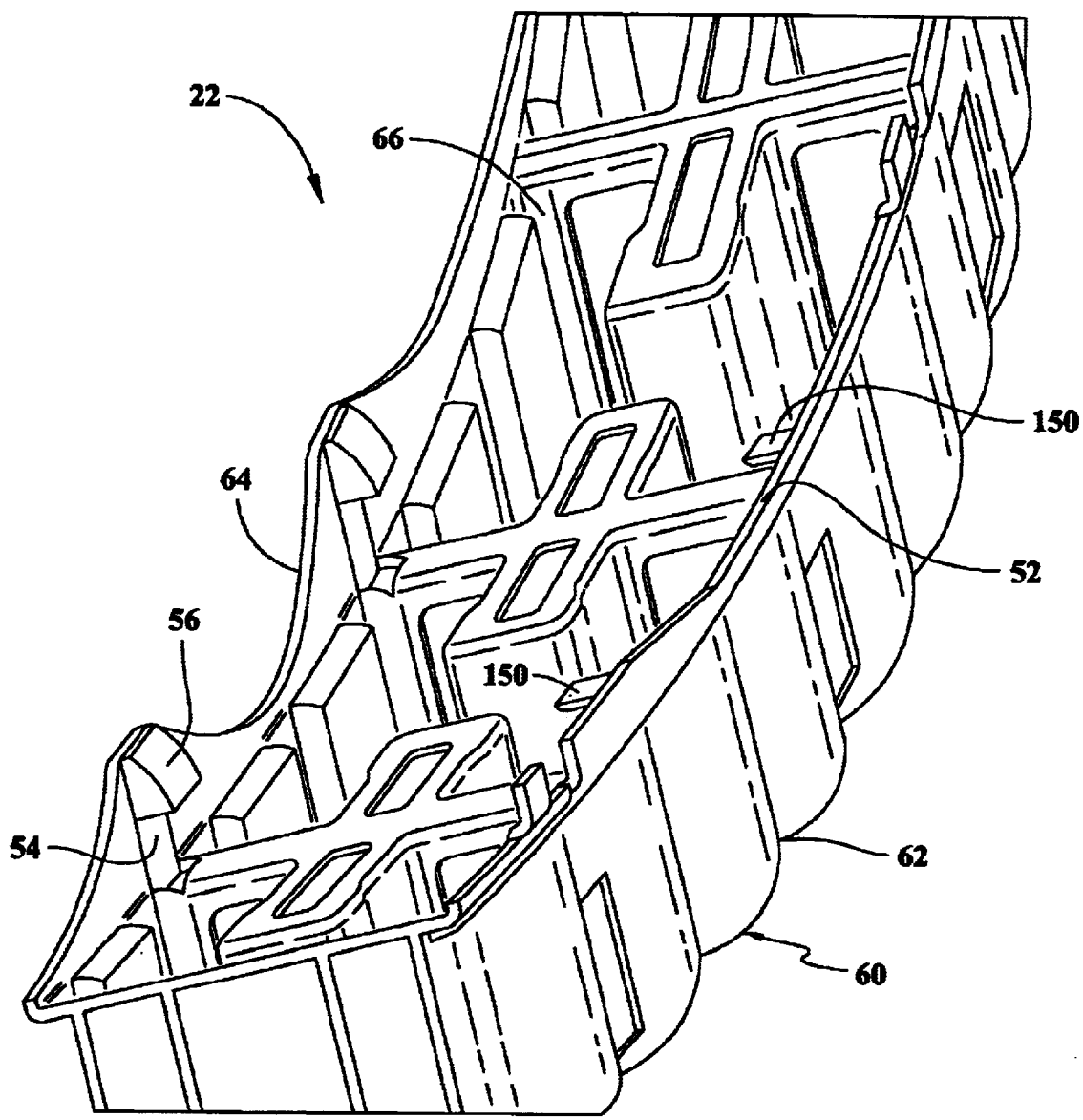
FIG. 10 is a perspective view of a portion of an energy absorber illustrating snap fit and tight fit features.

FIG. 10 is a perspective view of a portion of energy absorber 22 illustrating snap fit and tight fit features. As shown in FIG. 10, energy absorber flange 52 is u-shaped. Extensions 150 from flange 52 facilitate forming a tight fit with beam 24. That is, extensions 150 are flexible and accommodate a tolerance in the thickness of flange 26 of beam 24 (see FIG. 4) so that absorber 22 forms a tight fit with beam 24. Also, and as described above, flange 54 includes finger 56 which forms a snap fit with flange 28 of beam 24, i.e., finger 56 snaps over an end of flange 28.

The characteristics of the material utilized to form energy absorber 22 include high toughness/ductility, thermally stable, high energy absorption capacity, a good modulus-to-elongation ratio and recyclability. While the energy absorber may be molded in segments, the absorber also can be of unitary construction made from a tough plastic material. An example material for the absorber is Xenoy, as referenced above. Of course, other engineered thermoplastic resins can be used. Typical engineering thermoplastic resins include, but are not limited to, acrylonitrile-butadiene-styrene (ABS), polycarbonate, polycarbonate/ABS blend, a copolycarbonate-polyester, acrylic-styrene-acrylonitrile (ASA), acrylonitrile-(ethylene-polypropylene diamine modified)-styrene (AES), phenylene ether resins, blends of polyphenylene ether/polyamide (NORYL GTX® from General Electric Company), blends of polycarbonate/PET/PBT, polybutylene terephthalate and impact modifier (XENOY® resin from General Electric Company), polyamides, phenylene sulfide resins, polyvinyl chloride PVC, high impact polystyrene (HIPS), low/high density polyethylene (1/hdpe), polypropylene (pp) and thermoplastic olefins (tpo).

As explained above, coupling an injection molded thermoplastic energy absorber with a stiff beam is believed to provide enhanced energy absorption efficiency. Combining and Azdel I-beam with a Xenoy energy absorber, as described above, is believed to result in a greater than fifty percent (50%) efficiency. Enhanced impact performance translates to reduced costs of repair for low speed "fender benders" and reduced vehicle damage during higher speed collisions. Also, since both the energy absorber and beam can be fabricated with unitary and integrally molded thermoplastic engineering resins, both the energy absorber and beam can be easily independently recycled. Further, since foam is not utilized, it is believed that greater consistency of impact performance may be achieved over varied temperatures.

The strength of the I-beam along with the energy absorber tunable crush cans provides an efficient, fast loading and controlled impact event. This high efficiency is believed to result in facilitating reducing vehicle bumper offsets without increasing the loads transferred to the vehicle structure. The I-beam/energy absorber combination further gives rise to a lightweight, impact efficient, and cost-effective system that meets FMVSS and IIHS requirements.

While the invention has been described in terms of various specific embodiments, those skilled in the art will recognize that the invention can be practiced with modification within the spirit and scope of the claims.

What is claimed is:

1. A shockless bumper system comprising a thermoplastic beam and an energy absorber coupled to said beam, said beam comprising a flange, said energy absorber comprising a flanged frame for attachment to said beam and a body extending from said frame, said body comprising a first transverse wall, a second transverse wall spaced from said first wall and a plurality of tunable crush boxes extending therebetween, said flanged frame comprising at least one finger configured to snap over said beam flange, said bumper system having greater than fifty percent efficiency.

2. A shockless bumper system according to claim 1 wherein said energy absorber is injection molded.

3. A shockless bumper system according to claim 1 wherein said beam is an I-beam and comprises a first flange extending from a first surface and a second flange extending from a second surface, and a plurality of stiffening ribs on at least one of said first and second surfaces.

4. A shockless bumper system according to claim 1 wherein said beam comprises a compression molded glass mat thermoplastic.

5. A shockless bumper system according to claim 1 wherein said first and second transverse walls are rippled, and wherein said crush boxes are spaced apart along the body and have open areas disposed therebetween.

6. A shockless bumper system according to claim 1 wherein said crush boxes have an overall three dimensional I-shape and comprise side and rear walls.

7. A shockless bumper system according to claim 6 wherein said side and rear walls comprise windows of predetermined shape and size.

8. A shockless bumper system according to claim 1 wherein said energy absorber form a snap fit with said beam.

9. A shockless bumper system according to claim 1 wherein said energy absorber comprises extensions that form a tight fit with said beam.

10. A bumper assembly for an automotive vehicle comprising:
    a thermoplastic beam configured to maintain a section modulus throughout an impact event, said beam comprising at least one flange;
    a non-foam type thermoplastic energy absorber coupled to said beam, said energy absorber comprising a flanged frame for attachment to said beam, said flanged frame comprising at least one finger configured to snap over said beam flange; and
    a fascia attachable to said energy absorber to substantially envelop said beam and said energy absorber.

11. A bumper assembly according to claim 10 wherein said beam is compression molded and said energy absorber is injection molded.

12. A bumper assembly according to claim 10 wherein said beam is an I-beam and comprises a first flange extending from a first surface and a second flange extending from a second surface, and a plurality of stiffening ribs on at least one of said first and second surfaces.

13. A bumper assembly according to claim 10 wherein said beam comprises a compression molded glass mat thermoplastic.

14. A bumper assembly according to claim 10 wherein said energy absorber is a unitary elongated energy absorber and comprises a body extending from said frame, said body comprising a first transverse wall, a second transverse wall spaced from said first wall and a plurality of tunable crush boxes extending therebetween.

15. A bumper assembly according to claim 14 wherein said first and second transverse walls are rippled, and wherein said crush boxes are spaced apart along the body and have open areas disposed therebetween, said crush boxes having an overall three dimensional I-shape and comprise side and rear walls.

16. A bumper assembly according to claim 10 wherein said energy absorber forms a snap fit with said beam.

* * * * *